US010899010B2

(12) United States Patent
Arita et al.

(10) Patent No.: US 10,899,010 B2
(45) Date of Patent: Jan. 26, 2021

(54) CABLE DAMAGE DETECTION ASSISTANCE APPARATUS AND CABLE DAMAGE DETECTION ASSISTANCE METHOD IN ROBOT MECHANISM

(71) Applicant: FANUC CORPORATION, Yamanashi (JP)

(72) Inventors: Soichi Arita, Yamanashi (JP); Kokoro Hatanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 179 days.

(21) Appl. No.: 16/004,464

(22) Filed: Jun. 11, 2018

(65) Prior Publication Data

US 2018/0354134 A1 Dec. 13, 2018

(30) Foreign Application Priority Data

Jun. 12, 2017 (JP) ................................ 2017-115039

(51) Int. Cl.
*B25J 9/16* (2006.01)

(52) U.S. Cl.
CPC ........... *B25J 9/1674* (2013.01); *B25J 9/1664* (2013.01); *B25J 9/1694* (2013.01); *G05B 2219/42268* (2013.01)

(58) Field of Classification Search
CPC ........ B25J 9/1651; B25J 9/1694; B25J 19/06; B25J 9/1674; B25J 9/1664; G05B 15/02; G05B 19/05; G05B 23/02
See application file for complete search history.

(56) References Cited

U.S. PATENT DOCUMENTS

| 2004/0138783 A1* | 7/2004 | Watanabe | ............... | B25J 9/1674 |
| | | | | 700/259 |
| 2005/0264251 A1* | 12/2005 | Bischoff | ................ | B25J 9/1674 |
| | | | | 318/563 |

(Continued)

FOREIGN PATENT DOCUMENTS

| CN | 1743145 A | 3/2006 |
| CN | 101502961 A | 8/2009 |
| CN | 104209959 A | 12/2014 |

(Continued)

*Primary Examiner* — Kawing Chan
*Assistant Examiner* — Bradley R Brown
(74) *Attorney, Agent, or Firm* — Hauptman Ham, LLP (57) ABSTRACT

A cable damage detection assistance apparatus in a robot mechanism includes a program executor for executing a program to operate a robot, a plurality of times, while changing velocity for driving motors whenever the program is executed; a motor controller for controlling the motors; a state quantity detector for detecting a state quantity indicating an operation state of the robot during the execution of the program; an alarm generator that, when the state quantity exceeds a threshold value, generates an alarm and outputs information about a line number at that time; an alarm database for counting the number of occurrence of alarms on each line number on which the alarm has occurred, and storing the alarm occurrence number on each line number on a velocity-by-velocity basis; and an analysis display for displaying the relationship between the alarm occurrence number and the velocity on each line number.

14 Claims, 7 Drawing Sheets

(56) References Cited

U.S. PATENT DOCUMENTS

2014/0201571 A1* 7/2014 Hosek ................. G06F 11/2257
714/26
2015/0039128 A1* 2/2015 Oaki ...................... B25J 9/1641
700/253

FOREIGN PATENT DOCUMENTS

| CN | 105773604 A | 7/2016 |
| EP | 0263181 A1 | 4/1988 |
| EP | 2998894 A1 | 3/2016 |
| JP | 60-108904 A | 6/1985 |
| JP | 5-127734 A | 5/1993 |
| JP | 5-92810 U | 12/1993 |
| JP | H11-296224 A | 10/1999 |
| JP | 2009-172610 A | 8/2009 |
| JP | 2016-221582 A | 12/2016 |
| JP | 2017-61001 A | 3/2017 |

* cited by examiner

CABLE DAMAGE DETECTION ASSISTANCE APPARATUS AND CABLE DAMAGE DETECTION ASSISTANCE METHOD IN ROBOT MECHANISM

This application is a new U.S. patent application that claims benefit of JP 2017-115039 filed on Jun. 12, 2017, the content of JP 2017-115039 is incorporated herein by reference.

BACKGROUND OF THE INVENTION

1. Field of the Invention

The present invention relates to a cable damage detection assistance apparatus and a cable damage detection assistance method in a robot mechanism.

2. Description of Related Art

When there are large errors in positioning control of robots, or when current values of motors are largely different from assumed values, in general, alarms are generated to notify users of the occurrence of abnormalities. As the causes of the alarms, there can be various factors. One of the factors causing the alarms is cable damage (breaks) of the motors.

To identify the presence or absence of a break in a cable, which is used as a power line or a signal line in a robot mechanism, connected to a motor that controls an axis on which an alarm has generated, it is conceivable to detach the cable and check continuity of a wire (check a resistance value) with a tester.

Various methods for detecting an abnormality in the operation of a robot are reported so far. For example, a robot trajectory abnormality detection device that, in an industrial robot, when a trajectory of the robot has deviated from an original trajectory due to some reason beyond an allowable range during its reproduction operation, immediately detects the deviation and stops the robot is known (for example, Japanese Unexamined Patent Publication (Kokai) No. 60-108904, hereinafter referred to as "Patent Document 1").

A robot teaching assistance device that, in teaching a burring operation to a robot having a grinder based on a processing program, has the functions of monitoring a load on the grinder during processing, and recording and displaying a program step number and a load state at the time when the load exceeds a set value is also known (for example, Japanese Unexamined Patent Publication (Kokai) No. 05-092810, hereinafter referred to as "Patent Document 2").

Furthermore, a manipulator operation display device that includes a plurality of manipulators each for performing an operation such as a welding operation, a movement control unit for controlling a movement trajectory of each manipulator, and a teaching pendant for teaching the movement trajectory of the manipulator is known. The manipulator operation display device includes an operation display member provided in each manipulator, a selection switch provided in the pendant to select an arbitrary one of the manipulators, and a control means that, as well as setting the operation display member corresponding to the manipulator selected by the selection switch to a display state, when any of the manipulators becomes an abnormal state, sets the operation display member corresponding to the manipulator in the abnormal state to the display state (for example, Japanese Unexamined Patent Publication (Kokai) No. 05-127734, hereinafter referred to as "Patent Document 3").

As the causes of the occurrence of alarms, failures in drive systems, failures in detectors, and breaks in cables are conceivable. The causes are difficult to distinguish by conventional abnormality detection methods. As to the breaks in cables, in particular, it is often the case that the cable is incompletely broken. A break occurs only at the instant when the cable becomes a specific bent or twisted state in a mechanism during the operation of a robot. Although the break occurs at the time of generating an alarm, no break occurs at the time of stopping after coasting.

Therefore, even if the cable is detached and tested for continuity, no break is detected, as a result. Even if the break actually occurs at the instant when the cable becomes the specific bent or twisted state in the mechanism, it may be determined that no break is occurring based on the continuity test. None of Patent Documents 1 to 3 describes measures against this object, i.e. to detect an incomplete break state.

SUMMARY OF THE INVENTION

The present invention aims at providing a cable damage detection assistance apparatus and a cable damage detection assistance method, in a robot mechanism, that can assist in the detection of a cable damage invisible from outside, by visualizing an alarmed position and frequency on a program.

A cable damage detection assistance apparatus in a robot mechanism according to an embodiment of this disclosure includes a program executor for executing a program that includes multiple program steps and operates a robot by driving motors of the robot having axes, a plurality of times, while changing velocity for driving the motors whenever the program is executed; a motor controller for controlling the motors based on a command from the program executor; a state quantity detector for detecting a state quantity indicating an operation state of the robot during execution of the program; an alarm generator for comparing the state quantity with a threshold value set in advance, and, when the state quantity exceeds the threshold value, generating an alarm, and outputting information about a line number of the program step in which the alarm has occurred; an alarm database for counting the number of occurrence of alarms on each line number of the program step in which the alarm has occurred, and storing the alarm occurrence number on each line number on a velocity-by-velocity basis; and an analysis display for displaying the relationship between the alarm occurrence number and the velocity on each line number of the program step.

A cable damage detection assistance method in a robot mechanism according to an embodiment of this disclosure includes: executing a program that includes multiple program steps and operates a robot by driving motors of the robot having axes; controlling the motors based on a command outputted by the execution of the program; detecting a state quantity indicating an operation state of the robot during the execution of the program; comparing the state quantity with a threshold value set in advance, and, when the state quantity exceeds the threshold value, generating an alarm, and outputting information about a line number of the program step in which the alarm has occurred; executing the program, a plurality of times, while changing velocity for driving the motors whenever the program is executed; counting the number of occurrence of alarms on each line number of the program step in which the alarm has occurred, and storing the alarm occurrence number on each line number on a velocity-by-velocity basis; and displaying the relationship between the alarm occurrence number and the velocity on each line number of the program step.

BRIEF DESCRIPTION OF THE DRAWINGS

The objects, features, and advantages of the present invention will be more apparent from the following description of a preferred embodiment relating to the accompanying drawings. In the accompanying drawings.

DETAILED DESCRIPTION OF THE INVENTION

A cable damage detection assistance apparatus and a cable damage detection assistance method in a robot mechanism will be described below with reference to the drawings. However, the technical scope of the present invention is not limited to the embodiment, but embraces the invention described in claims and equivalents thereof.

Figure 1:
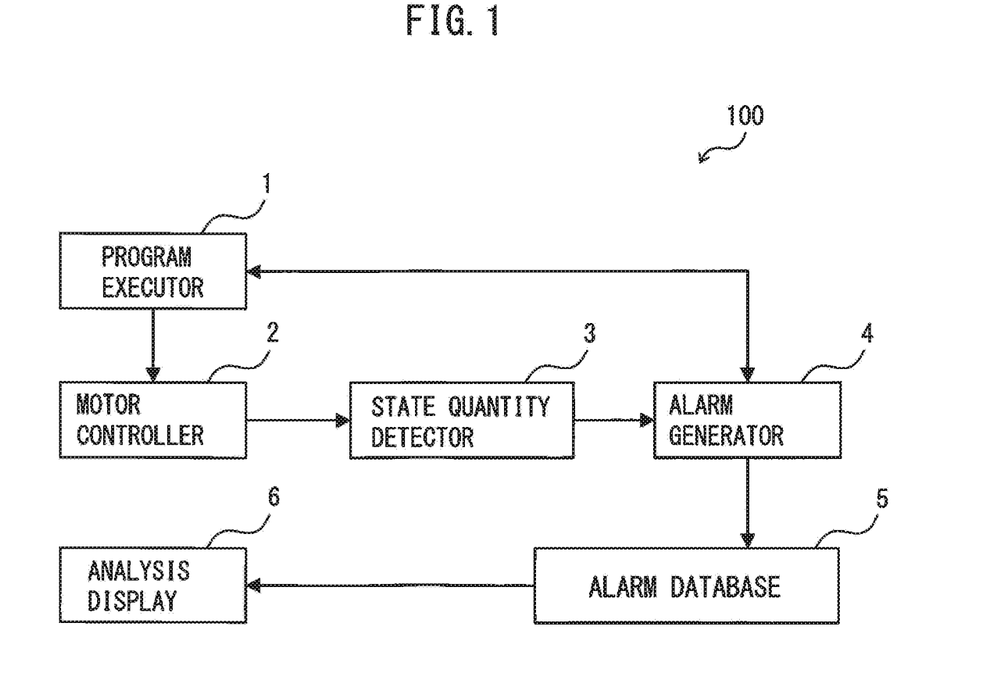
FIG. 1 is a block diagram of a cable damage detection assistance apparatus according to an embodiment.

FIG. 1 is a block diagram of a cable damage detection assistance apparatus according to an embodiment. A cable damage detection assistance apparatus 100 according to this embodiment includes a program executor 1, a motor controller 2, a state quantity detector 3, an alarm generator 4, an alarm database 5, and an analysis display 6.

The program executor 1 executes a program that includes multiple program steps and operates a robot (not shown) by driving motors of the robot having axes, a plurality of times, while changing velocity for driving the motors whenever the program is executed. A process to execute the program will be described later.

As a method for changing the velocity, an override by which a reference velocity is multiplied may be changed. For example, a robot may be operated at a reference velocity with an override of 100% on a first execution, may be operated at half of the reference velocity with an override of 50% on a second execution, and may be operated at one-tenth of the reference velocity with an override of 10% on a third execution.

Figure 2:
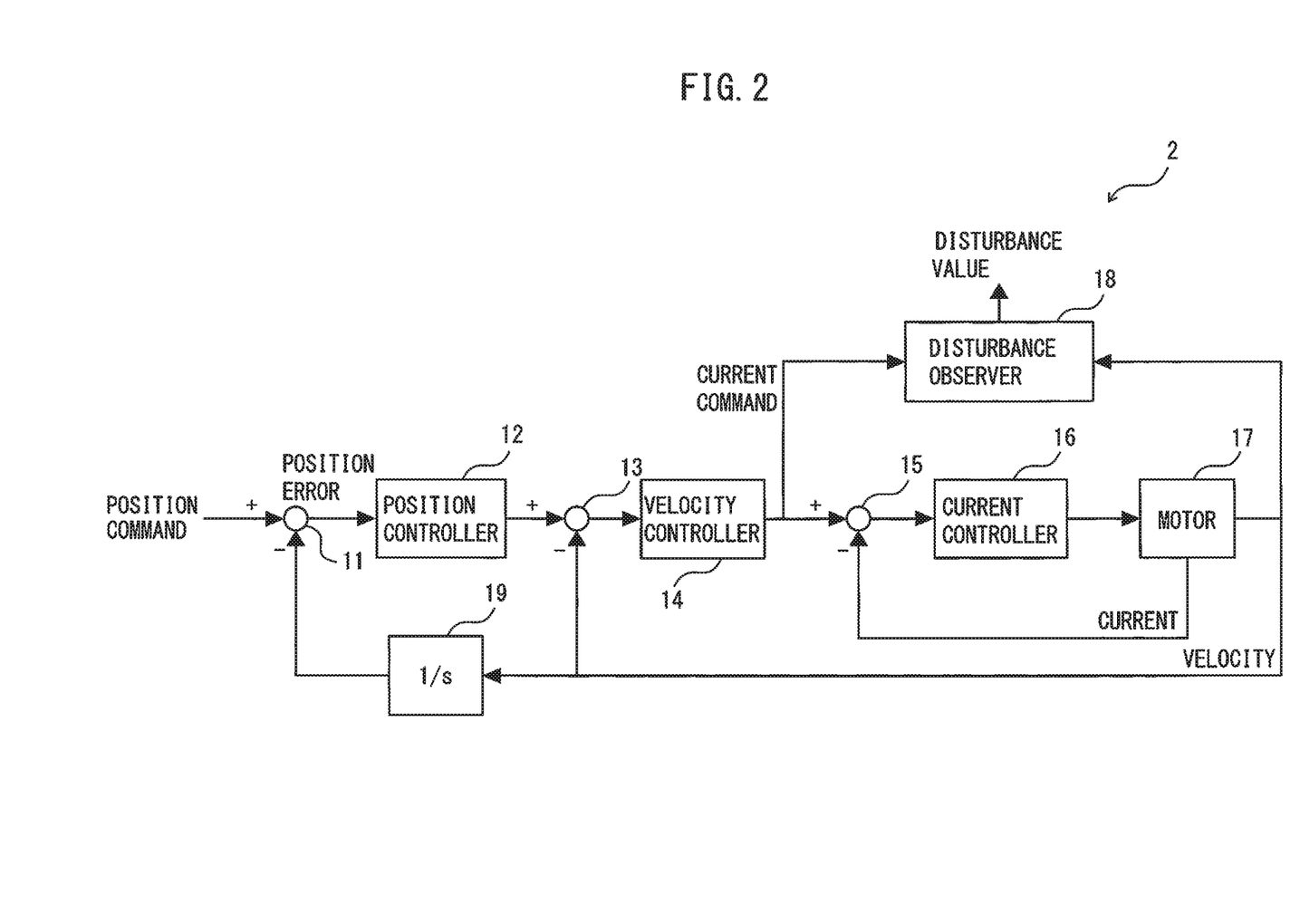
FIG. 2 is a block diagram of a motor controller of the cable damage detection assistance apparatus according to the embodiment.

The motor controller 2 controls the motors based on commands from the program executor 1. FIG. 2 is a block diagram of the motor controller of the cable damage detection assistance apparatus according to the embodiment.

FIG. 2 shows an example of inputting a position command to the motor controller 2. A first subtractor 11 subtracts a position feedback from the position command, and outputs a position error. The position error can be used as a state quantity to determine whether or not to generate an alarm. To obtain the position feedback, an integrator 19 integrates a velocity feedback from a motor 17.

The position error is inputted to a position controller 12, and the position controller 12 outputs a velocity command. A second subtractor 13 subtracts the velocity feedback of the motor 17 from the velocity command, and outputs a velocity error. The velocity error is inputted to a velocity controller 14, and the velocity controller 14 outputs a current command. A third subtractor 15 subtracts a current feedback of the motor 17 from the current command, and outputs a current error. The current feedback, which is a current flowing through the motor 17, can be used as a state quantity to determine whether or not to generate an alarm.

The current error is inputted to a current controller 16, and the current controller 16 outputs a torque command. The motor 17 is driven based on the torque command.

The current command outputted from the velocity controller 14 is also inputted to a disturbance observer 18. The disturbance observer 18 calculates a disturbance value from the current command. The disturbance value can be used as a state quantity to determine whether or not to generate an alarm.

The state quantity detector 3 detects a state quantity that represents an operation state of the robot during execution of the program. The state quantity can be detected from a component of the motor controller 2. As a first example, the state quantity may be a position error that is the difference between a position command for the motor and a position feedback from the motor. The state quantity detector 3 can obtain the position error from the first subtractor 11.

As a second example, the state quantity may be a current value fed back from the motor 17 for driving the robot. The state quantity detector 3 can obtain the current value from a current detector (not shown) for detecting a current flowing through the motor 17.

As a third example, the state quantity may be a disturbance value outputted from the disturbance observer 18 of a drive axis of the robot. The state quantity detector 3 can obtain the disturbance value from the disturbance observer 18.

The alarm generator 4 compares a state quantity with a threshold value set in advance. When the state quantity exceeds the threshold value, the alarm generator 4 generates an alarm, and outputs information about a line number of the program step in which the alarm has occurred. For example, when a position error is chosen as the state quantity, and the position error exceeds a threshold value, while a first axis is driven, an alarm occurs, and a line number (for example, "PROG1 L3") of the program step to drive the first axis is outputted. Alternatively, when a current value fed back from the motor is chosen as the state quantity, and the current value exceeds a threshold value, while a second axis is driven, an alarm occurs, and a line number (for example, "PROG2 L1") of the program step to drive the second axis is outputted. However, the present invention is not limited to these examples, one or more of a position error, a current value, and a disturbance value may be chosen as the state quantity or quantities. Besides, a value other than these three values may be set as the state quantity.

The alarm database 5 counts the number of occurrence of alarms on each line number of the program step, and stores the alarm occurrence number on each line number on a velocity-by-velocity basis. For example, it is assumed that, in a program to operate a robot, a motor for a first axis is driven three times, and the line number of a program step to operate the motor controlling the first axis is "PROG1 L3". In this case, in the operation of the robot, if an alarm has occurred three times, while the motor controlling the first axis is driven, an alarm occurrence number of "3" on the line number "PROG1 L3" is stored. Note that, at the time of actuating the robot, an initial value of the alarm occurrence number on each line number is set at "0". Thus, the alarm occurrence number is "0" on the line numbers of the program steps in which no alarm has occurred.

Figure 3:
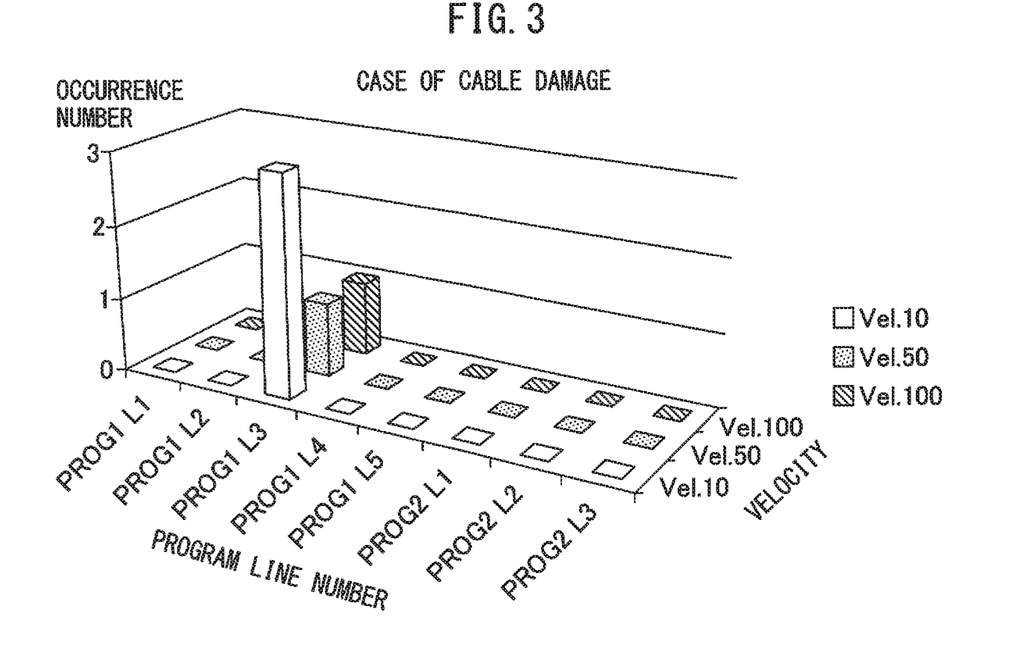
FIG. 3 is a graph representing the frequency of occurrence of alarms on each program line number, when changing velocity, and the graph shows an example of a case where a cable damage is assumed to have occurred.

The analysis display 6 displays the relationship between the alarm occurrence number on each line number of the program step and the velocity. For example, as shown in FIG. 3, the analysis display 6 may display a three-dimensional graph, in which an X axis represents the line number of the program step, a Y axis represents the velocity at the time of occurrence of alarms, and a Z axis represents the alarm occurrence number. A two-dimensional graph in which an X axis represents the line number of the program step, a Y axis represents the velocity at the time of occurrence of alarms, and the alarm occurrence number is distinguished by tones, etc., may be displayed. A table of the alarm occurrence number, in which the line number of the program step is listed in a row direction, and the velocity at the time of occurrence of alarms is listed in a column direction, may be displayed.

In the example of FIG. 3, when a robot is operated at a velocity of "Vel. 10" with an override of 10%, an alarm has occurred three times in a line number of "PROG1 L3". Furthermore, in the example of FIG. 3, when the robot is operated at each of a velocity of "Vel. 50" with an override of 50% and a velocity of "Vel. 100" with an override of 100%, an alarm has occurred once in the line number of "PROG1 L3". The graph of FIG. 3 indicates that no alarm has occurred at any velocity in the line numbers other than "PROG1 L3".

In the example of FIG. 3, even if the robot is operated at different velocities by changing the override between 10%, 50%, and 100%, the alarm occurrence number is higher in a specific line number ("PROG1 L3") than in the other line numbers, irrespective of the velocities. In this case, it is considered that, since the occurrence of alarms closely relates to a specific operation of the robot, a cable is likely damaged in the robot mechanism. In this manner, when the alarm occurrence number is higher in a specific line number than in the other line numbers, irrespective of the velocity, the analysis display 6 determines that a cable is likely damaged in the robot mechanism.

The graph of FIG. 3 shows an example having a high possibility of cable damage. As the causes of occurrence of alarms, a failure in a drive system, a failure in a detector, and a strong movement are further conceivable.

Figure 4:
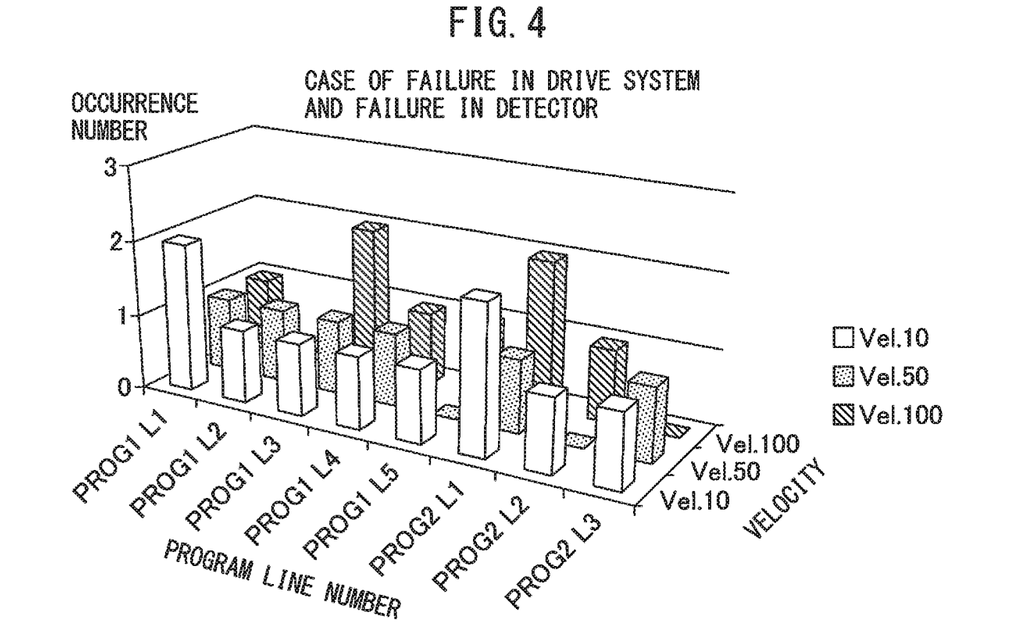
FIG. 4 is a graph representing the frequency of occurrence of alarms on each program line number, when changing velocity, and the graph shows an example of a case where a failure in a drive system or a failure in a detector is assumed to have occurred.

FIG. 4 is a graph representing the frequency of occurrence of alarms on each program line number, when the velocity is changed, and the graph shows an example of a case where a failure in a drive system or a failure in a detector is assumed to have occurred. As shown in FIG. 4, when the alarm occurrence number is not related to the line number of the program step, in other words, when alarms have occurred irrespective of the operation of the robot, a cause of the occurrence of alarms is not likely to be cable damage, but is likely to be a failure in a drive system or a failure in a detector.

Figure 5:
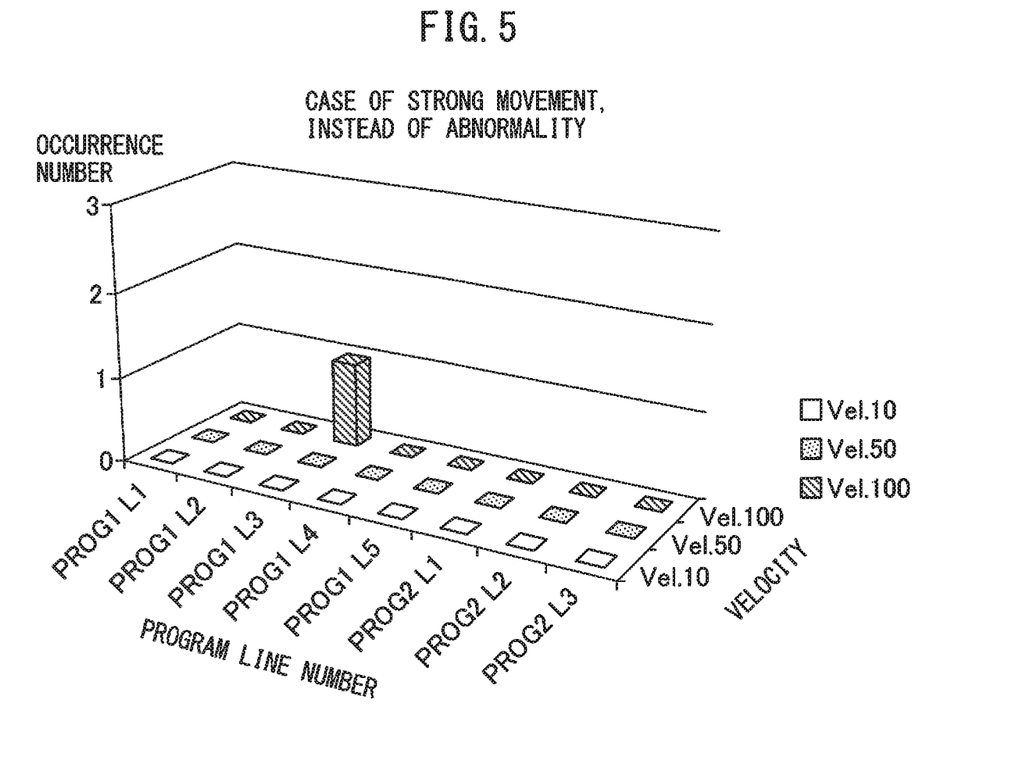
FIG. 5 is a graph representing the frequency of occurrence of alarms on each program line number, when changing velocity, and the graph shows an example of a case where a strong movement, instead of an abnormality, is assumed to have occurred.

FIG. 5 is a graph representing the frequency of occurrence of alarms in each program line number, when the velocity is changed, and the graph shows an example of a case where a strong movement, instead of an abnormality, is assumed to have occurred. As shown in FIG. 5, an alarm has occurred in a specific line number ("PROG1 L3") at a velocity of "Vel. 100" with an override of 100%. On the other hand, no alarm has occurred at the other velocities "Vel. 10" and "Vel. 50" with overrides of 10% and 50%. Although the alarm occurrence number is higher in a specific line number, as descried above, when the occurrence of alarms is observed at a specific velocity, in other words, when the alarm occurrence number is related to the velocity, the cause of the alarm is not likely to be cable damage, but is likely to be, for example, a strong movement.

As described above, according to the cable damage detection assistance apparatus in the robot mechanism according to the embodiment, it is possible to determine the presence or absence of the possibility of a cable break, by focusing attention on the occurrence of alarms in the same line number of the program step having the same robot position, which is a feature of an incomplete break, irrespective of the operation velocity of the robot.

Figure 6:
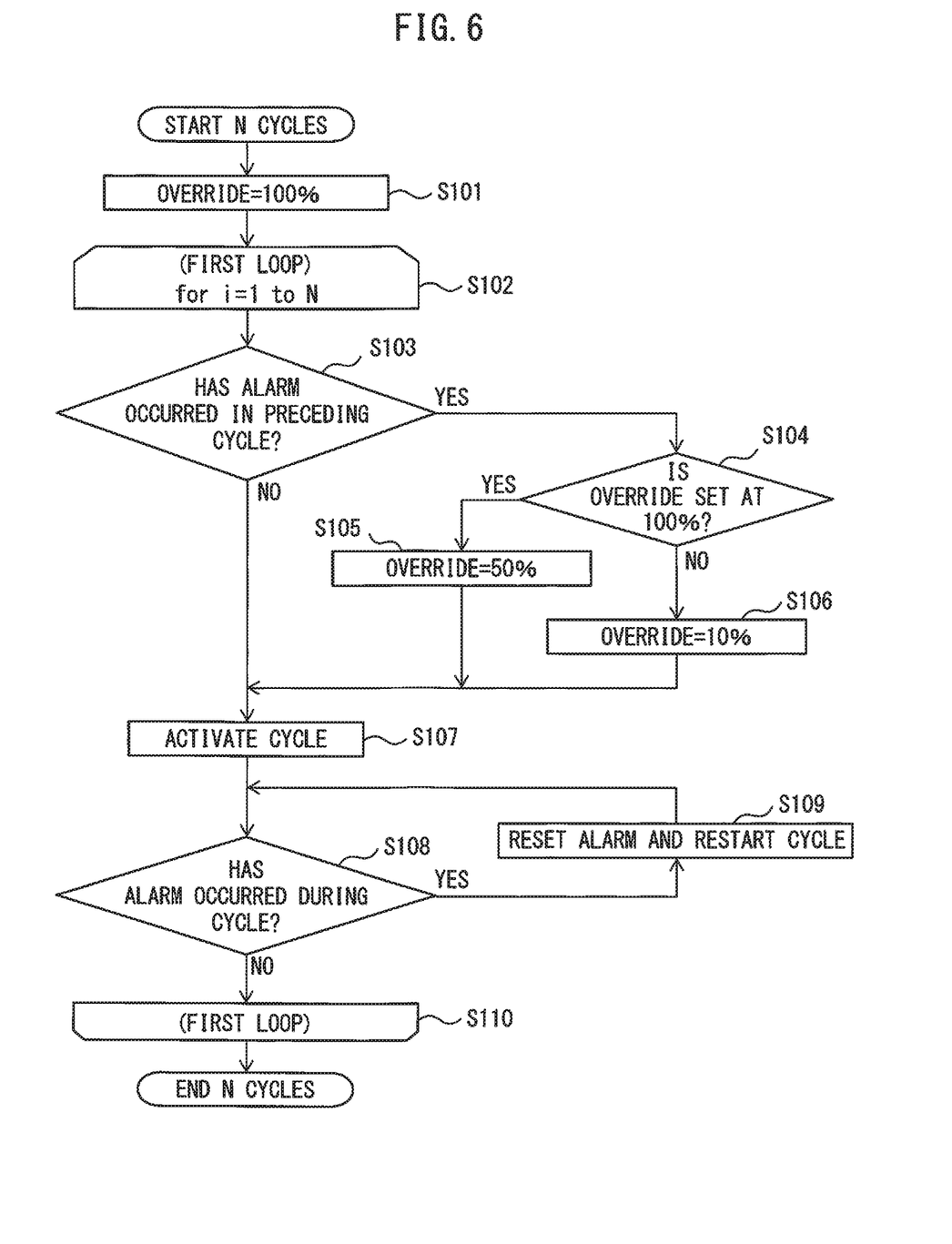
FIG. 6 is a flowchart of a process to execute a program a plurality of times, while changing velocity, in a cable damage detection assistance method according to the embodiment.

Next, a cable damage detection assistance method in the robot mechanism according to the embodiment will be described. FIG. 6 is a flowchart of a process to execute a program a plurality of times, while changing velocity, in the cable damage detection assistance method according to the embodiment. First, in step S101, an override is set at 100%. In this embodiment, by way of example, the velocity is changed by multiplying a command velocity by the override. However, the present invention is not limited to this example, and the command velocity itself may be changed.

Next, in a process of steps S102 to S110, a first loop is repeated N times. In this embodiment, since the velocity is changed at three levels, N is preferably 3 or more.

Next, in step S103, whether or not an alarm has occurred in a preceding cycle, i.e. an immediately preceding cycle of a present cycle is determined. As described later, "cycle" refers to a process between activation of a program to operate the robot and storing a line number on which an alarm has occurred and an alarm occurrence number.

In step S103, when no alarm has occurred in the preceding cycle ("NO"), the present cycle is activated at the same velocity as the preceding cycle, without changing the override, in step S107. However, the override is set at 100% in a first cycle, because no preceding cycle has yet been executed.

On the other hand, in second or later cycles, when an alarm has occurred in the preceding cycle ("YES"), whether or not the override is set at 100% is determined in step S104. When the override is set at 100% ("YES"), the alarm has occurred while the robot is operated with an override of 100%, and data about a line number of a program step in which the alarm has occurred and an alarm occurrence number has already been obtained. Therefore, in step S105, the override is set at 50%.

When the override is not set at 100% in step S104, the alarm has occurred while the robot is operated with an override of 50%, and data about a line number of a program step in which the alarm has occurred and an alarm occurrence number has already been obtained. Therefore, in step S106, the override is set at 10%. The override is set at 100%, 50%, and 10% in this manner.

Next, in step S107, a cycle is activated. A cycle execution process will be described later. After the cycle is activated in step S107, whether or not an alarm has occurred in the cycle is determined in step S108. When an alarm has occurred during the program to operate the robot ("YES"), the robot is stopped. However, in order to execute all program steps of the program, in step S109, the alarm is reset, and the program is restarted from the next step of the program step in which the alarm has occurred.

When no alarm has occurred in the cycle ("NO"), in step S110, the first loop is repeatedly executed, until the number of executions reaches N. When the first loop has been executed N times, the cycle is ended.

Figure 7:
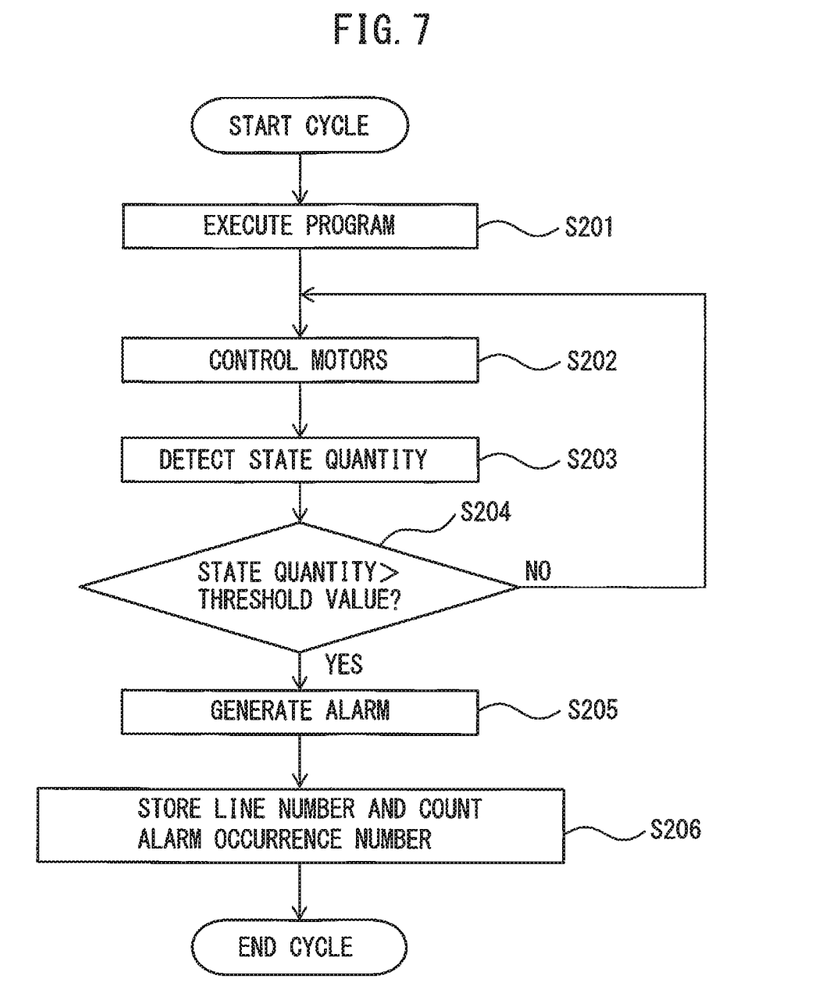
FIG. 7 is a flowchart of a process to determine a line number on which an alarm has occurred and the number of occurrence of alarms, in the cable damage detection assistance method according to the embodiment.

Next, the cycle execution process in step S107 will be described. FIG. 7 is a flowchart of the cycle execution process in the cable damage detection assistance method according to the embodiment. First, in step S201, the program executor 1 (see FIG. 1) executes a program that includes program steps and operates a robot by driving motors of the robot having axes.

Next, in step S202, the motor controller 2 controls the motors based on a command outputted by the execution of the program.

Next, in step S203, the state quantity detector 3 detects a state quantity that indicates an operation state of the robot during the execution of the program.

Next, in step S204, the alarm generator 4 compares the state quantity with a threshold value set in advance, and determines whether or not the state quantity exceeds the threshold value. When the state quantity is equal to or less than the threshold value ("NO"), the process returns to step S202 and continuously executes the program. On the other hand, when the state quantity exceeds the threshold value ("YES"), an alarm is generated in step S205. Furthermore, in step S206, the line number of the program step in which the alarm has occurred is stored, and an alarm occurrence number is counted.

As described above, when the robot is operated while changing its velocity, information about the line number of the program step in which the alarm has occurred, and information about the alarm occurrence number on each line number are obtained.

Figure 8:
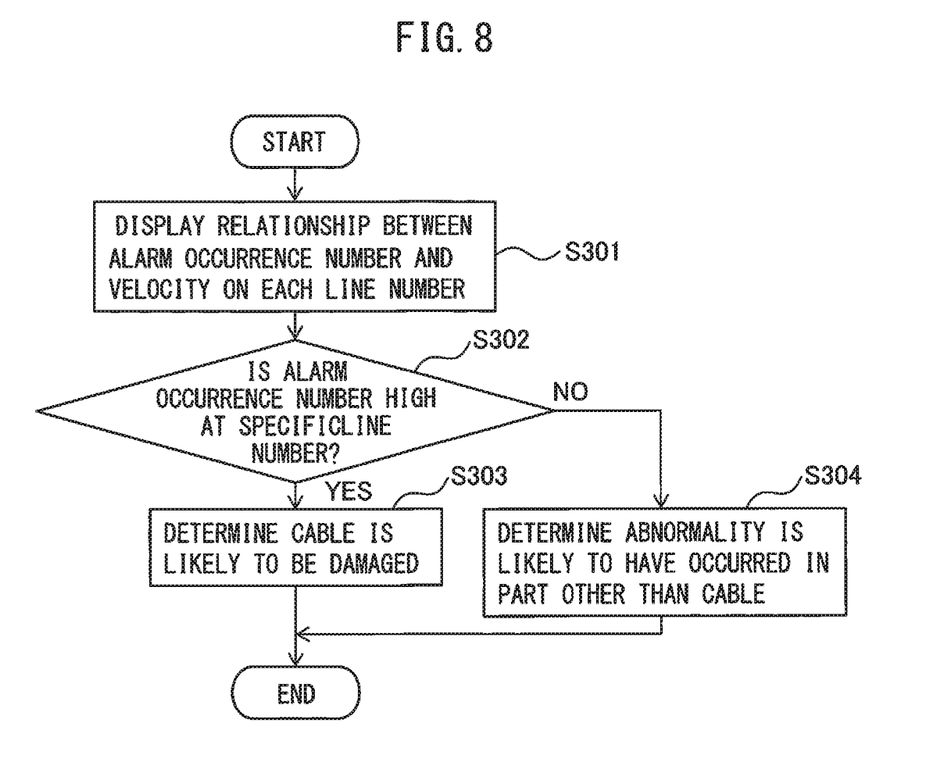
FIG. 8 is a flowchart of a process to determine whether or not a cable is damaged, in the cable damage detection assistance method according to the embodiment.

Next, a method for determining whether or not a cable is damaged, based on the obtained information, will be described. FIG. 8 is a flowchart of a process to determine whether or not a cable is damaged, in the cable damage detection assistance method according to the embodiment.

First, in step S301, the relationship between the alarm occurrence number and the velocity on each line number is displayed. For example, as shown in FIGS. 3 to 5, a three-dimensional graph in which an X axis represents the line number of the program step, a Y axis represents the velocity at the time of the occurrence of alarms, and a Z axis represents the alarm occurrence number is displayed.

Next, in step S302, whether or not the alarm occurrence number is higher in a specific line number than in the other line numbers, irrespective of the velocity, is determined. For example, as shown in the graph of FIG. 3, when the alarm occurrence number is determined to be higher in a specific line number than in the other line numbers, irrespective of the velocity ("YES"), in step S303, it is determined that a cable is likely to be damaged.

On the other hand, as shown in the graphs of FIGS. 4 and 5, when the alarm occurrence number is not determined to be higher in a specific line number than in the other line numbers, irrespective of the velocity ("NO"), in step S304, it is determined that an abnormality is likely to occur in a part other than cables.

As described above, according to the cable damage detection assistance method in the robot mechanism of the embodiment, since the alarm occurrence position (program and line) and the alarm occurrence frequency (occurrence number) are graphically displayed, the occurrence of alarms in the same robot position, which is a feature of cable damage, can clearly appeal. Furthermore, visualizing the alarm occurrence position and the alarm occurrence frequency can prevent an oversight of cable damage, which is invisible from outside.

The cable damage detection assistance apparatus and the cable damage detection assistance method in the robot mechanism according to the embodiment of this disclosure can assist in the detection of cable damage invisible from outside, by visualizing the alarm occurrence position and frequency on the program.

What is claimed is:

1. A cable damage detection assistance apparatus in a robot mechanism comprising:
   a program executor configured to execute a program that includes multiple program steps and operates a robot by driving motors of the robot having axes, a plurality of times, wherein velocity for driving the motors is changed each time the program is executed;
   a motor controller configured to control the motors based on a command from the program executor;
   a state quantity detector configured to detect a state quantity indicating an operation state of the robot during execution of the program;
   an alarm generator configured to compare the state quantity with a threshold value set in advance, and, when the state quantity exceeds the threshold value, generate an alarm, and output information about a line number of the program step in which the alarm has occurred;
   an alarm database configured to
      count the number of occurrence of alarms on each line number of the program step in which the alarm has occurred when the program step is executed to drive a motor of the robot at a velocity among a plurality of velocities, and
      store the counted number of occurrence of alarms on each line number for each velocity among the plurality of velocities; and
   an analysis display configured to display, for each line number of the program step, the relationship between (a) the counted number of occurrence of alarms and (b) the velocity at which the alarm occurred.

2. The cable damage detection assistance apparatus in the robot mechanism according to claim 1,
   wherein when the alarm occurrence number is higher on a specific line number than on the other line numbers, irrespective of the velocity, the analysis display determines that a cable is likely to be damaged in the robot mechanism.

3. The cable damage detection assistance apparatus in the robot mechanism according to claim 1,
   wherein the state quantity is an error in position control of the robot, the error being the difference between a position command to the motor and a position feedback from the motor.

4. The cable damage detection assistance apparatus in the robot mechanism according to claim 1,
   wherein the state quantity is a current value fed back from the motor for driving the robot.

5. The cable damage detection assistance apparatus in the robot mechanism according to claim 1,
wherein the state quantity is a disturbance value outputted from a disturbance observer for a drive axis of the robot.

6. The cable damage detection assistance apparatus in the robot mechanism according to claim 1,
wherein the analysis display displays a three-dimensional graph, in which an X axis represents the line number of the program step, a Y axis represents the velocity at the time of occurrence of alarms, and a Z axis represents the alarm occurrence number.

7. A cable damage detection assistance method in a robot mechanism comprising:
executing a program that includes multiple program steps and operates a robot by driving motors of the robot having axes;
controlling the motors based on a command outputted by the execution of the program;
detecting a state quantity indicating an operation state of the robot during the execution of the program;
comparing the state quantity with a threshold value set in advance, and, when the state quantity exceeds the threshold value, generating an alarm, and outputting information about a line number of the program step in which the alarm has occurred;
executing the program a plurality of times, wherein velocity for driving the motors is changed each time the program is executed;
counting the number of occurrence of alarms on each line number of the program step in which the alarm has occurred when the program step is executed to drive a motor of the robot at a velocity among a plurality of velocities, and storing the counted number of occurrence of alarms on each line number for each velocity among the plurality of velocities; and
displaying, for each line number of the program step, the relationship between (a) the counted number of occurrence of alarms and (b) the velocity at which the alarm occurred.

8. The cable damage detection assistance method in the robot mechanism according to claim 7,
wherein when the alarm occurrence number is higher on a specific line number than on the other line numbers, irrespective of the velocity, it is determined that a cable is likely to be damaged in the robot mechanism.

9. The cable damage detection assistance method in the robot mechanism according to claim 7,
wherein the state quantity is an error in position control of the robot, the error being the difference between a position command to the motor and a position feedback from the motor.

10. The cable damage detection assistance method in the robot mechanism according to claim 7,
wherein the state quantity is a current value fed back from the motor for driving the robot.

11. The cable damage detection assistance method in the robot mechanism according to claim 7,
wherein the state quantity is a disturbance value outputted from a disturbance observer for a drive axis of the robot.

12. The cable damage detection assistance method in the robot mechanism according to claim 7,
wherein a three-dimensional graph in which an X axis represents the line number of the program step, a Y axis represents the velocity at the time of occurrence of alarms, and a Z axis represents the alarm occurrence number is displayed.

13. The cable damage detection assistance apparatus in the robot mechanism according to claim 1, wherein
the analysis display is configured to display the relationship between (a) the alarm occurrence number and (b) the velocity on each line number of the program step to visualize an alarmed position and the alarm occurrence number on the program by using a graph.

14. The cable damage detection assistance method in the robot mechanism according to claim 7, wherein the displaying comprises visualizing an alarmed position and the alarm occurrence number on the program by using a graph showing the relationship between (a) the alarm occurrence number and (b) the velocity on each line number of the program step.

* * * * *